(12) United States Patent
Inaba et al.

(10) Patent No.: US 8,071,189 B2
(45) Date of Patent: Dec. 6, 2011

(54) BLOW MOLDED BODY

(75) Inventors: Takeshi Inaba, Settsu (JP); Shigehito Sagisaka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 221 days.

(21) Appl. No.: 12/443,383

(22) PCT Filed: Sep. 28, 2007

(86) PCT No.: PCT/JP2007/069034
§ 371 (c)(1),
(2), (4) Date: Mar. 27, 2009

(87) PCT Pub. No.: WO2008/041643
PCT Pub. Date: Apr. 10, 2008

(65) Prior Publication Data
US 2010/0075089 A1 Mar. 25, 2010

(30) Foreign Application Priority Data

Sep. 29, 2006 (JP) ................... 2006-269881
Feb. 21, 2007 (JP) ................... 2007-041429
Aug. 31, 2007 (JP) ................... 2007-226860

(51) Int. Cl.
*B32B 27/08* (2006.01)
*B32B 27/32* (2006.01)
*B32B 27/34* (2006.01)
*B32B 27/38* (2006.01)
*B32B 27/00* (2006.01)
*B32B 1/08* (2006.01)

(52) U.S. Cl. ............... 428/35.7; 428/36.6; 428/36.91; 428/421; 428/422; 428/474.4; 428/475.5; 428/475.8; 428/500; 428/515; 428/516; 428/523

(58) Field of Classification Search ............... 428/34.1, 428/35.7, 36.6, 36.7, 36.8, 36.9, 36.91, 421, 428/422, 474.4, 475.5, 475.8, 476.1, 476.3, 428/476.9, 500, 515–521, 523
See application file for complete search history.

(56) References Cited

U.S. PATENT DOCUMENTS 5,858,492 A * 1/1999 Roeber et al. ............... 428/36.91
6,479,161 B1 11/2002 Araki et al.

FOREIGN PATENT DOCUMENTS

| | | |
|---|---|---|
| JP | 63-145025 A | 6/1988 |
| JP | 01-123744 A | 5/1989 |
| JP | 08-252891 A | 10/1996 |
| JP | 11-207840 A | 8/1999 |
| JP | 2006-044201 A | 2/2006 |
| WO | 98/55557 A1 | 12/1998 |

* cited by examiner

*Primary Examiner* — Walter B Aughenbaugh
(74) *Attorney, Agent, or Firm* — Sughrue Mion, PLLC

(57) ABSTRACT

A hollow molded article including a polyolefin resin-based layer (A), a modified polyolefin resin-based layer (B) and a fluororesin-based layer (C), wherein the fluororesin-based layer (C) constitutes at least one of the innermost and outermost layers of the hollow molded article.

8 Claims, 1 Drawing Sheet

BLOW MOLDED BODY

TECHNICAL FIELD

The present invention relates to a hollow molded article.

BACKGROUND ART

Fluoropolymers are excellent in heat resistance, chemical resistance, weathering resistance, surface characteristics (low frictional characteristics etc.) and electrical insulating properties thereof and, therefore, have so far been in various fields of application.

On the other hand, fluoropolymers are generally insufficient in mechanical strength and dimensional stability and are expensive from the cost viewpoint.

Therefore, various investigations have been made concerning adhesion or lamination between a fluoropolymer and other organic materials or adhesion or lamination between a fluoropolymer and an inorganic material in order to make the best use of the advantageous features of fluoropolymers and minimize the drawbacks thereof.

As regards fluoropolymer laminates, laminated structures comprising a functional group-containing fluoropolymer and a fluorine-free thermoplastic resin, for example a polyamide resin or a modified polyolefin resin, have been proposed (cf. e.g. Patent Document 1: International Publication WO 98/55557).

However, there are problems; for example, when such a polyamide resin or modified polyolefin resin, which is expensive, is used as a main constituent in the laminated structure, a cost of the laminated molded article as a whole rises and, when a modified polyolefin resin, which generally contains reactive functional groups, is used as the outermost layer, the environment resistance of the laminated molded article decreases.

DISCLOSURE OF INVENTION

Problems which the Invention is to Solve

It is an object of the present invention to provide a hollow molded article which is excellent in chemical resistance, fuel resistance, weathering resistance and low fuel permeability and can be produced at low cost. The "hollow molded article" so referred to herein is a molded article having a space therewithin and includes not only those closed at one end and having only one opening, for example tanks, bottles and bags, but also those opened at both ends, for example tubes, hoses and pipes.

Means for Solving the Problems

The present invention is a hollow molded article comprising a polyolefin resin-based layer (A), a modified polyolefin resin-based layer (B) and a fluororesin-based layer (C), wherein the fluororesin-based layer (C) constitutes at least one of the innermost and outermost layers.

The present invention is a laminate comprising a polyolefin resin-based layer (A), a modified polyolefin resin-based layer (B) and a fluororesin-based layer (C), wherein the fluororesin-based layer (C) constitutes at least one of the innermost and outermost layers.

In the following, the invention is described in detail.

The invention relates to a hollow molded article comprising a polyolefin resin-based layer (A), a modified polyolefin resin-based layer (B) and a fluororesin-based layer (C).

Since it comprises a polyolefin resin-based layer (A) and a fluororesin-based layer (C), the hollow molded article of the invention is superior in chemical resistance, fuel resistance and low fuel permeability to a conventional ones formed of a general-purpose plastic material or elastomer; for example, it can show satisfactory levels of chemical resistance, fuel resistance and low fuel permeability against ethanol and other alcohols and against aqueous solutions of urea. Furthermore, it comprises a modified polyolefin resin-based layer (B) and therefore the adhesion between the polyolefin resin-based layer (A) and the fluororesin-based layer (C) can be improved, making it possible to obtain a hollow molded article excellent in impact resistance and mechanical strength.

In a practice of the invention, the fluororesin constituting the layer (C) mentioned above is a homopolymer or copolymer comprising repeating units derived from at least one fluorinated ethylenic monomer.

The above-mentioned fluororesin may be one obtained by polymerization on a fluorinated ethylenic monomer(s) alone or one obtained by polymerization of a fluorinated ethylenic monomer(s) and an ethylenic monomer(s) containing no fluorine atom.

In the practice of the invention, the fluororesin layer may comprise only one fluororesin species or two or more fluororesin species.

The fluorinated ethylenic monomer mentioned above is not particularly restricted but may be any of fluorine atom-containing olefinically unsaturated monomers, for example tetrafluoroethylene [TFE], vinylidene fluoride, chlorotrifluoroethylene [CTFE], vinyl fluoride, hexafluoropropylene [HFP], hexafluoroisobutene, monomers represented by the formula (i):

$$CH_2=CX^1(CF_2)_nX^2 \quad (i)$$

(wherein $X^1$ is H or F, $X^2$ is H, F or Cl and n is an integer of 1 to 10), perfluoro (alkyl vinyl ethers) represented by $CF_2=CF-ORf^1$ (in which $Rf^1$ represents a perfluoroalkyl group containing 1 to 8 carbon atom) [PAVEs], vinyl monomers represented by $CX^3X^4=CX^5(CF_2)_nX^6$ (in which $X^3$, $X^4$ and $X^5$ are the same or different and each represents hydrogen atom or fluorine atom, $X^6$ represents hydrogen atom, fluorine atom or chlorine atom and n represents an integer of 1 to 10) and alkyl perfluorovinyl ether derivative represented by $CF_2=CF-OCH_2-Rf^2$ (in which $RF^2$ is a perfluoroalkyl group containing 1 to 5 carbon atom).

As the above-mentioned PAVEs, there may be mentioned perfluoro (methyl vinyl ether) [PMVE], perfluoro (ethyl vinyl ether) [PEVE], perfluoro (propyl vinyl ether) [PPVE], perfluoro (butyl vinyl ether) and the like: among them, PMVE, PEVE or PPVE is preferred.

As the above-mentioned alkyl perfluorovinyl ether derivates, there may be mentioned those in which $Rf^2$ is a perfluoroalkyl group containing 1 to 3 carbon atom and, among them, $CF_2=CF-OCH_2-CF_2CF_3$ is preferred.

The fluorine atom-free ethylenic monomer mentioned above is preferably selected from among ethylenic monomers containing not more than 5 carbon atom from the viewpoint of retaining heat resistance and chemical resistance, among others. As such monomer, there may be mentioned, for example, ethylene, propylene, 1-butene, 2-butene, vinyl chloride and vinylidene chloride.

Further, it may be such a copolymerizable unsaturated carboxylic acid as described in International Publication WO 2005/100420.

The above-mentioned unsaturated carboxylic acid is preferably one containing at least one carbon-carbon unsaturated bond enabling copolymerization (hereinafter also referred to as "copolymerizable carbon-carbon unsaturated bond") per molecule and further containing at least one carbonyloxy group [—C(=O)—O—] per molecule.

As the aliphatic unsaturated carboxylic acid may be an aliphatic unsaturated monocarboxylic acid or an aliphatic unsaturated polycarboxylic acid containing two or more carboxyl groups; thus, mention may be made of (meth)acrylic acid, crotonic acid, maleic acid, fumaric acid, itaconic acid, citraconic acid, mesaconic acid, aconitic acid and like unsaturated aliphatic carboxylic acids containing 3 to 6 carbon atom.

The aliphatic unsaturated carboxylic acid may be an unsaturated aliphatic polycarboxylic acid containing 3 to 6 carbon atom. The unsaturated aliphatic polycarboxylic acid is not particularly restricted but includes, among others, maleic acid, fumaric acid, itaconic acid, citraconic acid, mesaconic acid and aconitic acid and it may be a acid anhydride of maleic acid, itaconic acid or citraconic acid.

When the above fluororesin is produced by using a fluorinated ethylenic monomer(s) and a fluorine atom-free ethylenic monomer(s), the monomer composition thereof may be such that amount of the fluorinated ethylenic monomer(s) accounts for 10 to 100 mole percent (preferably 30 to 100 mole percent) and that of the fluorine atom-free ethylenic monomer(s) for 0 to 90 mole percent (preferably 0 to 70 mole percent).

As the fluororesin to be used in the practice of the invention, there may be mentioned chlorotrifluoroethylene [CTFE]-based polymers, tetrafluoroethylene/hexafluoropropylene [FEP]-based copolymers, tetrafluoroethylene/perfluoro(alkyl vinyl ether) [PFA]-based copolymers, ethylene/tetrafluoroethylene [ETFE]-based copolymers, ethylene/tetrafluoroethylene/hexafluoropropylene [EFEP]-based copolymers, and poly(vinylidene fluoride) [PVdF]-based polymers, among others.

The above fluororesin is preferably a perhalopolymer. By using a perhalopolymer, it becomes possible to further improve the chemical resistance. The perhalopolymer is a polymer in which halogen atoms are bound to all carbon atoms constituting the main chain of the polymer.

The above-mentioned fluororesin is more preferably a CTFE-based polymer, a FEP-based copolymer or a PFA-based copolymer, still more preferably a CTFE-based polymer.

As the CTFE-based polymer, there may be mentioned, for example, polychlorotrifluoroethylene [PCTFE] and a CTFE-based copolymer.

Preferred as the CTFE-based copolymer is those whose constituent elements are CTFE units, TFE units and monomer [α] units derived from a monomer [α] copolymerizable with CTFE and TFE and in which the sum of the CTFE units and TFE units amounts to 90 to 99.9 mole percent and the monomer [α] units amount to 0.1 to 10 mole percent. When the monomer [α] unit content is lower than 0.1 mole percent, the moldability, environmental stress cracking resistance and environmental cracking resistance for fuel tend to become poor and, when it is above 10 mole percent, the low fuel permeability, heat resistance and mechanical characteristics tend to become inferior.

When the monomer [α] is a PAVE, a more preferred lower limit to the monomer [α] unit content is 0.5 mole percent and a more preferred upper limit thereto is 5 mole percent.

The ratio between the CTFE units and TFE units in the CTFE-based copolymer mentioned above is such that the CTFE units amount to 15 to 90 mole percent and the TFE units to 85 to 10 mole percent, more preferably the CTFE units amount to 20 to 90 mole percent and the TFE units to 80 to 10 mole percent.

The "CTFE unit" and "TFE unit" so referred to herein are respectively a CTFE-derived moiety [—CFCl—CF$_2$—] and a TFE-derived moiety [—CF$_2$—CF$_2$—] in the molecular structure of the CTFE copolymer and, similarly, the "monomer [α] unit" is a moiety resulting from addition of the monomer [α] in the molecular structure of the CTFE-based copolymer.

The monomer unit content, for example the CTFE unit content, so referred to herein, is a value obtained by carrying out $^{19}$F-NMR analysis.

The above-mentioned monomer [α] is not particularly restricted but may be any of those monomers copolymerizable with CTFE and TFE; thus, there may be mentioned, for example, ethylene [Et], vinylidene fluoride [VdF], the above-mentioned PAVE species represented by $CF_2=CF—ORf^1$, the above-mentioned vinyl monomers represented by $CX^3X^4=CX^5(CF_2)_nX^6$ and the above-mentioned alkyl perfluorovinyl ether derivates represented by $CF_2=CF—OCH_2—Rf^2$.

PMVE, PEVE or PPVE is preferred as the above-mentioned PAVE.

$CF_2=CF—OCH_2—CF_2CF_3$ is preferred as the above-mentioned alkyl perfluorovinyl ether derivative.

The above-mentioned monomer [α] may further be an unsaturated carboxylic acid copolymerizable with CTFE and TFE as described in International Publication WO 2005/100420.

The above-mentioned unsaturated carboxylic acid is preferably one having at least one carbon-carbon unsaturated bond enabling copolymerization (hereinafter referred to also as "copolymerizable carbon-carbon unsaturated bond") in each molecule and having at least one carbonyloxy group [—C(=O)—O—] in each molecule.

The unsaturated aliphatic carboxylic acid may be an unsaturated aliphatic monocarboxylic acid or an unsaturated aliphatic polycarboxylic acid containing two or more carboxyl groups and includes, among others, (meth) acrylic acid, crotonic acid, maleic acid, fumaric acid, itaconic acid, citraconic acid, mesaconic acid, aconitic acid and like unsaturated aliphatic carboxylic acids containing 3 to 6 carbon atom.

The unsaturated aliphatic carboxylic acid may also be an unsaturated aliphatic polycarboxylic acid containing 3 to 6 carbon atom. The unsaturated aliphatic polycarboxylic acid is not particularly restricted but includes, among others, maleic acid, fumaric acid, itaconic acid, citraconic acid, mesaconic acid and aconitic acid; it may also be the acid anhydride of maleic acid, itaconic acid or citraconic acid.

The monomer [α] may also be an unsaturated compound represented by the general formula:

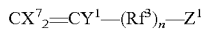

$$CX^7{}_2=CY^1—(Rf^3)_n—Z^1$$

wherein $Z^1$ represents an adhesive functional group, which is to be described later herein, $X^7$ and $Y^1$ are the same or different and each represents hydrogen or fluorine atom, $Rf^3$ represents an alkylene group containing 1 to 40 carbon atom, a fluorinated oxyalkylene group containing 1 to 40 carbon atom, an ether bond-containing fluorinated alkylene group containing 1 to 40 carbon atom or an ether bond-containing fluorinated oxyalkylene group containing 1 to 40 carbon atom and n represents 0 or 1.

The above-mentioned FEP copolymer preferably has a TFE unit content of 98 to 80 mole percent and an HFP unit content of 2 to 20 mole percent.

The above-mentioned FEP copolymer may comprise, in addition to the TFE units and HFP units, monomer [$\alpha^1$] units derived from a monomer [$\alpha^1$] copolymerizable with TFE and HFP.

The above-mentioned monomer [$\alpha^1$] is not particularly restricted but may be any of compounds copolymerizable with TFE and HFP, including those compounds enumerated hereinabove referring to the monomer [$\alpha$].

When it contains monomer [$\alpha^1$] units, the above-mentioned FEP-based copolymer is preferably one having a total content of HFP and TFE units of 90 to 99.9 mole percent and a monomer [$\alpha^1$] unit content of 0.1 to 10 mole percent since such one is excellent in flexibility and low fuel permeability.

Such fluororesins as mentioned above are excellent in barrier properties against liquid chemicals and therefore can give a hollow molded article which is sufficient in low fuel permeability.

In the practice of the invention, the above-mentioned fluororesin, when it is an adhesive functional group-containing one, can provide a hollow molded article excellent in impact resistance and strength since an adhesiveness thereof to the layer (B) and to a layer (D) to be mentioned later herein is then improved.

As the adhesive functional group, there may be mentioned, for example, a carbonyl group, a hydroxyl group and an amino group, among others.

The "carbonyl group" so referred to herein is a carbon-derived divalent group comprising a carbon-oxygen double bond, typically the group represented by —C(=O)—. The carbonyl group is not particularly restricted but may be a moiety of such a chemical structure as a carbonate group, a carboxylic acid halide group (haloformyl group), a formyl group, a carboxyl group, an ester bond [—C(=O)O—], an acid anhydride bond [—C(=O)O—C(=O)—], an isocyanato group, an amido group, an imido group [—C(=O)—NH—C(=O)-], a urethane bond [—NH—C(=O)O—], a carbamoyl group [NH$_2$—C(=O)-], a carbamoyloxy group [NH$_2$—C(=O)O—], a ureido group [NH$_2$—C(=O)—NH-] or an oxamoyl group [NH$_2$—C(=O)—C(=O)-], for instance.

At least one hydrogen atom bound to the nitrogen atom of an amido group, imido group, urethane bond, carbamoyl group, carbamoyloxy group, ureido group or oxamoyl group, for instance, may be substituted by a hydrocarbon group such as an alkyl group.

Preferred as the above-mentioned adhesive functional group are amide, carbamoyl, hydroxyl, carboxyl, carbonate, carboxylic acid halide groups since these are easy to introduce and the resins obtained show proper heat resistance and good adhesiveness at relatively low temperature; in particular, those carbonate group and/or carboxylic acid halide group-containing ones which are described in WO 99/45044 are preferred among others.

The number of adhesive functional groups which the above-mentioned fluororesin has can be appropriately selected according to a counterpart species to be used for lamination, the shape, the purpose of adhesion, the intended use, the adhesion strength required, the fluororesin species and the method of bonding and other differences. Preferably, however, the number of adhesive functional groups is 3 to 1000, more preferably 50 to 500, per 1×10$^6$ main chain carbon atom in the polymer constituting the fluororesin.

When the fluororesin to be used in a practice of the invention is an adhesive functional group-containing one, it may comprise a polymer whose main chain is an adhesive functional group-terminated one or which has such group or groups on a side chain or chains, or may comprise a polymer whose main chain is an adhesive functional group-terminated one and which further has such group or groups on a side chain or chains. When the main chain thereof is an adhesive functional group-terminated one, the fluororesin may have such groups on both ends of the main chain or may have such a group only on either of the ends thereof. When the adhesive functional group is an ether bond-containing one, one or more such adhesive functional groups may occur in the main chain.

The above-mentioned fluororesin is preferably one comprising a polymer whose main chain is an adhesive functional group-terminated one, since such fluororesin will not markedly reduce a mechanical characteristics or chemical resistance or it is advantageous from a productivity and cost points of view.

As for the method of adhesive functional group introduction, a monomer or monomers containing such a functional group as mentioned above may be introduced into the polymer by copolymerization or such a group may be introduced in a form of a polymerization initiator.

In a practice of the invention, the above-mentioned fluororesin preferably has a melting point of 160 to 270° C., although this range has no limitative meaning.

The molecular weight of the above-mentioned fluororesin is preferably within such a range that the mechanical characteristics, barrier properties against liquid chemicals and other characteristics required of the product hollow molded article can be realized. When, for example, the melt flow rate [MFR] is employed as an indicator of the molecular weight, it is preferred that the MFR at an temperature within the range of about 230 to 350° C., which is a molding temperature range for fluororesins in general, be 0.5 to 100 g/10 minutes.

The melting point of each resin as shown herein is a value determined as the temperature corresponding to the maximum value on a heat-of-fusion curve as measured using a DSC apparatus (product of Seiko) at a programming rate of 10° C./minute, and the MFR is a value determined by measuring the weight (g) of the polymer flowing out from a nozzle with a diameter of 2 mm and a length of 8 mm at each temperature and under a load of 5 kg during a unit time (10 minutes) using a melt indexer (product of Toyo Seiki Seisakusho).

The above-mentioned fluororesin can be obtained by any of the conventional polymerization methods known in the art, for example by suspension polymerization, solution polymerization, emulsion polymerization or bulk polymerization. In the polymerization mentioned above, the temperature, pressure and other conditions, the polymerization initiator and another additive or additives can be appropriately selected according to the composition and amount of the desired fluororesin.

The fluororesin-based layer (C) may have a surface subjected to adhesive surface treatment for the purpose of improving the interlaminar bonding and of improving the shock resistance and strength of the product hollow molded article.

The adhesive surface treatment to be carried out in a practice of the invention is not particularly restricted but there may be mentioned, for example, such known technologies as etching treatment, plasma treatment, corona treatment and photochemical treatment.

The above adhesive surface treatment can be carried out under conditions properly selected according to the composition of the fluororesin employed and other factors.

As the polyolefin resin constituting the layer (A) mentioned above, there may be mentioned propylene homopolymers, propylene-ethylene block copolymers, low-density polyethylene, medium-density polyethylene, high-density polyethylene and ultrahigh-density polyethylene, among others.

Among them, high-density polyethylene is preferred as the polyolefin resin mentioned above.

As the modified polyolefin resin constituting the layer (B) mentioned above, there may be mentioned maleic acid modifications, epoxy modifications or amine ($-NH_2$) modifications and other modifications of propylene homopolymers, propylene-ethylene block copolymers, low-density polyethylene, medium-density polyethylene, high-density polyethylene, ultrahigh-density polyethylene, etc.

Among them, epoxy-modified high-density polyethylene and amine-modified high-density polyethylene are more preferred as the modified polyolefin resin mentioned above.

Preferably, the hollow molded article of the invention further comprises a polyamide resin layer (D) between the layer (B) and layer (C). The polyamide resin constituting the layer (D) mentioned above comprises a polymer having an amide bond [—NH—C(=O)-] as a repeating unit within the molecule.

The polyamide resin may be a so-called nylon resin comprising a polymer resulting from bonding of each intramolecular amide bond to an aliphatic and/or an alicyclic structure(s) or a so-called aramid resin comprising a polymer resulting from bonding of each intramolecular amide bond to aromatic structures.

The above-mentioned nylon resin is not particularly restricted but includes, among others, those comprising such a polymer as nylon 6, nylon 66, nylon 11, nylon 12, nylon 610, nylon 612, nylon 6/66, nylon 66/12, nylon 46 or a metaxylylenediamine/adipic acid copolymer. Two or more of these may also be used in combination.

The above polyamide resin may also comprise a polymer whose molecule partly contains a structure having no amide bond as the repeating unit as introduced therein by block copolymerization or graft copolymerization.

As such a polyamide resin, there may be mentioned, for example, those comprising a nylon 6/polyester copolymer, a nylon 6/polyether copolymer, a nylon 12/polyester copolymer, a nylon 12/polyether copolymer and a like polyamide elastomer.

These polyamide elastomers are the ones obtained by block copolymerization of nylon oligomers with polyester oligomers via ester bonding or the ones obtained by block copolymerization of nylon oligomers with polyether oligomers via ether bonding. As the polyester oligomers, there may be mentioned, for example, polycaprolactone and polyethylene adipate oligomers; as the polyether oligomers, there may be mentioned, for example, polyethylene glycol, polypropylene glycol and polytetramethylene glycol oligomers. Preferred as the polyamide elastomers are nylon 6/polytetramethylene glycol copolymers and nylon 12/polytetramethylene glycol copolymers.

The amine value of the polyamide resin mentioned above may be 10 to 60 (equivalents/$10^6$ g). A preferred lower limit thereto may be 15 (equivalents/$10^6$ g), a preferred upper limit thereto may be 50 (equivalents/$10^6$ g) and a more preferred upper limit may be 35 (equivalents/$10^6$ g).

The "amine value" so referred to herein is a value determined by dissolving 1 g of the polyamide resin in 50 ml of m-cresol with heating and titrating the solution with a 1/10 N aqueous solution of p-toluenesulfonic acid with thymol blue as the indicator and, unless otherwise specified, it means the amine value of the polyamide resin prior to lamination.

The resin constituting each of the layers mentioned above may comprise one single resin species or two or more species.

Each of the layers mentioned above may further contain one or more of various fillers such as inorganic powders, glass fibers and metal oxides each incorporated therein at an addition level not causing any impairment in performance characteristics according to the purpose and/or intended use and, further, may contain, in addition to a filler or fillers, one or more of heat stabilizers, reinforcing agents, ultraviolet absorbers, pigments and other any additives as incorporated therein.

As the additives mentioned above, there may be added, for example, montmorillonite, beidellite, saponite, nontronite, hectorite, sauconite, stevensite and like lamellar smectite clay minerals as well as microlamellar minerals having a high aspect ratio, for example mica species, for reducing the levels of permeation of liquid chemicals.

As such an additive as mentioned above, there may be added, for example, an electrically conductive filler for imparting electric conductivity. The electrically conductive filler is not particularly restricted but may be, for example, a powder or fibrous form of a conductive simple substance, such as a metal or carbon; a powder form of a conductive compound such as zinc oxide; or a powder provided with electric conductivity by surface treatment.

The powder- or fibrous-form conductive simple substance is not particularly restricted but includes, among others, metal powders such as copper and nickel powders; metal fibers such as iron and stainless steel fibers; carbon black, carbon fibers, and carbon fibrils described in Japanese Kokai Publication H03-174018 and elsewhere.

The powder provided with electric conductivity by surface treatment is a powder derived from glass beads or such a nonconductive powder as a titanium oxide powder by surface treatment for rendering the surface thereof electrically conductive.

The method of treatment for rendering the surface conductive is not particularly restricted but includes, among others, metal sputtering and nonelectrolytic plating. Among the conductive fillers mentioned above, carbon black is suitably used since it is advantageous from a economical viewpoint and from a electrostatic charge storage inhibition viewpoint. When the conductive filler is incorporated, it is preferred that pellets be prepared in advance by melting and kneading the resin with the filler.

The conductive resin composition with the filler incorporated therein preferably has a volume resistivity of $1 \times 10^0$ to $1 \times 10^9 \Omega \cdot cm$. A more preferred lower limit is $1 \times 10^2 \Omega \cdot cm$ and a more preferred upper limit is $1 \times 10^8 \Omega \cdot cm$.

In the case of providing electric conductivity, the innermost layer-forming fluororesin to come into contact with a fuel may alone be provided with electric conductivity. In this case, the fluororesin layer may also be provided with a conductive fluororesin layer as a further inner layer relative thereto.

The hollow molded article of the invention comprises the polyolefin-based layer (A), modified polyolefin-based layer (B) and fluororesin-based layer (C) arranged in that order in the manner of lamination, wherein at least one of the innermost layer and outermost layer is the layer (C). The hollow molded article of the invention contains the layer (B) between the layer (A) and layer (C) and, therefore, the adhesion between the layer (A) and layer (C) can be at an increased level. When the hollow molded article of the invention contains the polyamide resin-based layer (D) between the layer (B) and layer (C), the bond strength can be at a still increased level. Since, however, the layer constitution becomes complicated and the cost increases in this case, the article may be one having no layer (D).

The laminate structure of the above-mentioned hollow molded article is preferably a polyolefin resin layer [layer (A)]/modified polyolefin resin layer [layer (B)]/fluororesin layer [layer (C)] (outer layer/intermediate layer/inner layer) structure or a polyolefin resin layer [layer (A)]/modified polyolefin resin layer [layer (B)]/polyamide resin layer [layer (D)]/fluororesin layer [layer (C)] (outermost layer/outer layer/intermediate layer/innermost layer) structure. The modified polyolefin resin (layer [B]) disposed as an intermediate layer can favorably contribute to enhancement of the adhesion between the fluororesin [layer (C)] and polyolefin resin [layer (A)].

Preferred layer constitution examples of the laminate structure of the above-mentioned hollow molded article are not particularly restricted but, there may be mentioned, for example, polyethylene resin/modified polyethylene resin/fluororesin structure, fluororesin/modified polyethylene resin/polyethylene resin/modified polyethylene resin/fluororesin, and polyethylene resin/modified polyethylene resin/polyamide resin/fluororesin structures.

In addition to the layers mentioned above, a recycle layer may further be incorporated using pellets obtained by melting and kneading, on a twin-screw extruder or single extruder, waste resin materials caused on a occasion of processing into multilayer films or into bag-like shapes and/or resins separated from such hollow molded articles as mentioned above as recovered for recycling.

In the hollow molded article mentioned above, the layer (C) can have a thickness of 50 to 500 μm, and the other layers than the layer (C) can each have a thickness of 100 to 50000 μm.

The thickness of the layer (C) is preferably 100 to 300 μm, and the total thickness of the other layers is preferably 300 to 20000 μm, more preferably 900 to 10000 μm.

The size of the above-mentioned hollow molded article can be selected according to a intended use thereof.

In the present specification, the thickness of each of the layers is the thickness measured by means of a microscope or the like.

The fluororesin mentioned above preferably has a fuel permeability coefficient of not higher than 10 g·mm/m²/day, more preferably not higher than 7 g·mm/m²/day, still more preferably not higher than 5 g·mm/m²/day. When the fluororesin has a fuel permeability coefficient within the above range, the hollow molded article of the invention can have a high level of low fuel permeability.

The "fuel permeability coefficient" so referred to herein is the greater of the two values calculated from the changes in mass as measured at 60° C. for films obtained from a measurement target resin and placed in fuel permeability coefficient measurement cups containing an isooctane/toluene/ethanol mixed solvent (hereinafter referred to as CE10) prepared by mixing isooctane, toluene and ethanol together in a volume ratio of 45:45:10 or a mixed solvent (hereinafter referred to as CE85) prepared by mixing them together in a volume ratio of 7.5:7.5:85, respectively.

As regards the rate of fuel permeation through the hollow molded article of the invention, a lower limit thereto may be set, for example, at 0.05 g/m²/day and an upper limit thereto may be set, for example, at 30 g/m²/day.

In the present specification, the above-mentioned rate of fuel permeation is the mass of a liquid chemical permeating through the hollow molded article per unit time (day) per unit inner surface area and is the value by measuring the permeation level at 60° C. using CE10 or CE85.

A method of molding of the hollow molded article of the invention is not particularly restricted but an optimum method can be selected according to a intended use and desired shape of the hollow molded article. As examples of the molding method, there may be mentioned injection molding, press forming under vacuum or under pressure, blow molding, inflation molding and extrusion, among others.

The injection molding method is widely used in molding thermoplastic resins and suited for producing moldings complicated in shape. For molding laminates, the method can be carried out, for example, by injecting a molten resin into a mold for a molded article part, allowing the resin to solidify, injection another molten resin onto the thus-molded resin layer and allowing the same to solidify and repeating such procedure.

However, when the above-mentioned injection molding method is employed, the mold is to be removed after each molding steps and, therefore, a desired hollow molded article cannot be produced at one time but can be obtained by molding some parts separately and then joining them together by such means as thermal fusion or adhesion.

In a case of the molded article of the invention, in which it is essential that a fluororesin layer should constitute the innermost layer or outermost layer, even when such joining as mentioned above is made, the fluororesin layers can always be joined together mutually and the low fuel permeability of the hollow molded article as a whole can be maintained.

In the above-mentioned step of injection molding of each layer, it is preferred from the improved interlaminar adhesion viewpoint that the injection of the resin constituting each layer be followed by application of pressure while the mold temperature is maintained at 220 to 300° C., preferably about 240 to 280° C.

The order of the steps of molding the respective layers can be properly selected according to the desired laminated structure; thus, the outer surface layer may be molded first as mentioned above, or the inner surface layer may be molded first.

The respective injection molding conditions can be appropriately selected according to the kinds and amounts of the resins employed.

In the above-mentioned press forming, a sheet or plate obtained by the molding method to be described later herein (such sheet or plate is hereinafter collectively referred to as laminated sheet) is used as a raw material and this is formed by pressing the same, under heating, against a mold under vacuum or under pressure or using a male mold.

The press forming conditions can be properly selected according to the composition and thickness of the laminated sheet employed; it is preferred in the first step of heating the laminated sheet that the upper heater and lower heater be set at different temperatures according to the melting temperatures of the respective layers.

As the method of preparing the laminated sheet to serve as the raw material, there may be mentioned, for example, (1) the method comprising coextruding the resins in molten state to cause interlaminar thermal fusion bonding (fusion bonding) and thereby form a laminate having a multilayer structure in one step (coextrusion molding), (2) the method comprising placing films separately prepared on extruders one on top of another and causing interlaminar adhesion by thermal fusion bonding; (3) the method comprising extruding a molten resin onto the surface of a film prepared in advance to form a laminate, and (4) the method comprising applying, onto the surface of a film prepared in advance, a polymer to constitute a layer neighboring that film in a manner of electrostatic coating and then heating the coated film obtained wholly or from the coated side to heat and melt the polymer subjected to coating for layer formation.

When the resins constituting the respective layers are coextrudable, the above-mentioned coextrusion molding method (1) is generally employed for molding. As the coextrusion molding techniques, there may be mentioned a multimanifold technique, feed block technique, multilayer blowing technique, multilayer inflation molding technique and other multilayer coextrusion technique known in the art. By carrying out molding using these techniques, sheet-like or film-like laminates can be obtained.

In the case of the molding methods (2) and (3) mentioned above, the surface of each film after formation which is to come into contact with another film may be subjected to surface treatment for a purpose of enhancing the interlaminar adhesion. As such surface treatment, there may be mentioned etching treatment such as sodium etching treatment; photochemical treatment using a laser or excimer lamp or the like; corona treatment; and plasma treatment, among others. Plasma treatment is preferred, however. The plasma treatment can be carried out, for example, in an atmosphere of Ar, He, $H_2$, $O_2$, $N_2$, $NH_3$ or a hydrocarbon gas, or a mixed gas composed of these. When the film is subjected to such surface treatment, a sufficient level of bond strength can be obtained even when the fluororesin contains no adhesive functional group.

Preferred as the method of molding are the above-mentioned method (1) and methods (2) and (3) in which the lamination is preceded by surface treatment; from the production efficiency viewpoint, the method (1) is most preferred.

The hollow molded article of the invention can also be obtained by joining such laminated sheets as mentioned above by any known means to form a bag-like shape.

In cases where heat sealing or a like thermal fusion bonding method is employed as the means for joining, specifically, a pair of the above-mentioned laminated sheets are placed one on top of the other, preferably in a manner such that the fluororesin layers come into contact with each other, and heat sealing is carried out. It is necessary from the sheet-to-sheet seal strength viewpoint that the heat sealing temperature be not lower than the melting point of the adhesion target resin and not higher than the thermal decomposition temperature of the adhesion target resin and of the thermoplastic resin involved in the lamination. The heat sealing method is preferred since the seal is not affected by deterioration of an adhesive.

As the method of thermal fusion bonding, there may be mentioned, among others, the method using a hot platen, the method utilizing hot air, the method utilizing frictional heat (mechanical, ultrasonic) and the method utilizing high-frequency waves. The laminated sheets molded by such a method as vacuum forming, pressure forming, male die molding or injection molding may be once cooled and then processed into a bag-shaped product by such a thermal fusion bonding method as mentioned above. In the case of vacuum forming, pressure forming or male die molding, the laminated sheet is already in a heated condition, hence it is preferred, from the production efficiency viewpoint, that the thermal fusion bonding be carried out immediately thereafter.

Further, a technique of electrofusion (electric fusion bonding) using an electric heating wire at the fusion bonding site (s) can also be used as a method of thermal fusion bonding.

From the low fuel permeability and chemical resistance viewpoint, a hollow molded article of the invention is preferably produced by fusion bonding between the respective fluororesin layers; from the mechanical strength viewpoint, it is further preferred that the other resin layers, in particular external polyolefin layers, be mutually fusion-bonded. For facilitating mutual fusion bonding between respective layers, at least part of the edge of each sheet to be subjected to fusion bonding may be preliminarily processed as shown in FIG. 1.

In the following, an exemplary mode of edge processing of each sheet to be subjected to fusion bonding is described, referring to FIG. 1. FIG. 1 shows an example of the mode of preliminary processing of the edge of each laminated sheet to be subjected to joining. The numeral 3 stands for the polyolefin resin layer (A), 4 stands for the modified polyolefin resin layer (B), and 5 stands for the fluororesin layer (C). By processing the edge of each sheet 1 before processing into that of each sheet 2 after processing, it becomes possible to facilitate the fusion bonding of the respective layers. It is also possible to subject the edge of a product of fusion bonding of two sheets 1 before processing to the same processing as mentioned above, followed again by application of heat and pressure to the fusion-bonded part.

As another means for joining, there is also available the method utilizing an adhesive. In this case, for example, an adhesive is applied to sites to be joined together, the sites are pushed against each other, and the adhesive is at least partially cured. Then, the whole is allowed to stand in an environment maintained at 135 to 150° C. and the joint is then cooled under pressure. A period of 5 to 8 days is required for complete cure of this joint at room temperature.

When a hollow molded article of the invention is bag-like in shape, the wall thickness may be 50 μm or greater, preferably 100 μm or greater. In the case of a bag-like article, the thickness may be 500 μm or smaller, preferably 300 μm or smaller, provided that it is within the above range. If the thickness is excessively small, the low fuel permeability or mechanical strength may possibly become insufficient whereas, when the thickness is excessively large, the flexibility may become insufficient.

A hollow molded article of the invention can also be obtained by multilayer blow molding. The multilayer blow molding can be carried out by using a plurality of extruders the number of which corresponds to a required number of the layers, extruding molten resins through a multilayer blow molding die to form a parison, holding the parison in a split mold, blowing air or the like into the parison in the form of a bag sandwiched between the upper and lower parts of the split mold to thereby inflate the parison and cause the same to come into close contact with the inside wall of the mold, which has a desired shape, allowing the molded article to cool and solidify and then taking out the same as the molded product. An injection blow molding or stretch blow molding method may also be used. The above-mentioned multilayer blow molding can be carried out continuously in the series of steps to give moldings with ease, hence is preferred.

A hollow molded article of the invention may also be one having the inner surface layer-constituting fluororesin layer formed by coating.

The forming of the fluororesin layer by coating can be carried out, for example, by preparing a molded article composed of layers except for the fluororesin layer and having the desired shape by the above-mentioned injection molding or vacuum forming and then coating a fluororesin-containing coating composition to that molded article in a conventional manner, followed by drying.

The above-mentioned fluororesin layer produced by coating is preferably fluorinated in the conventional manner for further improving the barrier properties against liquid chemicals. Thus, it is also possible to form a coat layer using a fluororesin-containing coating composition comprising a PVdF copolymer or vinyl fluoride polymer whose baking temperature and fluorine content are low and then fluorinate that layer to form a fluororesin layer having high barrier properties.

A hollow molded article of the invention can suitably be used, for example, as a automotive gasoline tank or light oil tank or the like fuel tank, a radiator tank, a solvent tank, a paint tank, a container for a strongly corrosive or erosive liquid chemical such as an acid or alkali or the like liquid chemical for semiconductor manufacture, an abrasive slurry vessel, a tank for a drink or food, a liquid bottle, a container, a tank, a bag, or a tube or hose laid under the ground in a refueling station.

Owing to its excellent chemical resistance, a hollow molded article of the invention can also be suitably used as a container for an aqueous solution of urea in a system in which diesel engine exhaust gas is sprayed with the aqueous solution of urea to reduce $NO_x$.

A laminate comprising the polyolefin resin-based layer (A), the modified polyolefin resin-based layer (B) and the fluororesin-based layer (C), with the fluororesin layer (C) constituting at least one of the innermost and outermost layers also constitutes an aspect of the present invention.

As regards the laminate of the invention, the characteristics of the layer (A) to layer (C), the laminate structure, shape, thickness and production method are the same as in the case of the above-mentioned hollow molded article of the invention.

Like the above-mentioned hollow molded article, a laminate of the invention is excellent in chemical resistance, fuel resistance, weathering resistance and low fuel permeability and can be produced at low cost.

EFFECTS OF THE INVENTION

The hollow molded article of the invention, which has the constitution described hereinabove, is excellent in chemical resistance, fuel resistance, weathering resistance and low fuel permeability and can be produced at low cost.

BEST MODES FOR CARRYING OUT THE INVENTION

The following examples illustrate the present invention in further detail. These examples are, however, by no means limitative of the scope of the invention.

In the examples and comparative examples, various measurements were carried out by the methods described below.
Fluororesin Monomer Composition Measurements were made using an NMR spectrometer (product of Bruker BioSpin, model AC300, high-temperature probe).
Resin Melting Point The melting point was determined as the temperature corresponding to the maximum value on a heat-of-fusion curve recorded using a DSC apparatus (product of Seiko) at a programming rate of 10° C./minute.
MFR A melt indexer (product of Toyo Seiki Seisakusho) was used and the weight (g) of each polymer flowing out through a nozzle having a diameter of 2 mm and a length of 8 mm per unit time (10 minutes) at each measurement temperature and under a load of 5 kg was measured.
Number of Carbonate Groups Each copolymer in the form of a white powder or cut pieces of melt-extruded pellets was compression-molded at room temperature to give a film with the thickness of 50 to 200 µm. This film was subjected to infrared absorption spectrometry and an absorbance of a ν(C=O) peak due to the carbonyl group of the carbonate group [—OC(=O)O—] as appearing at an absorption wavelength in the range of 1810 to 1815 $cm^{-1}$[ν(C=O)] was measured, and the number N of carbonate groups per $10^6$ main chain carbon atom in the copolymer was calculated according to the formula (a) given below.

$$N=500\ AW/\epsilon df \quad (a)$$

A: Absorbance of carbonate group [—OC(=O)O—]-due ν(C=O) peak
ε: Molar extinction coefficient of carbonate group [—OC(=O)O—]-due ν(C=O) peak; ε was regarded as being ε=170 ($1 \cdot cm^{-1} \cdot mol^{-1}$) based on model compound data.
W: Average monomer molecular weight calculated from the copolymer composition
d: Film density ($g/cm^3$)
f: Film thickness (mm)

In the infrared absorption spectrometry, scanning was carried out 40 times using a Perkin-Elmer model 1760×FT-IR spectrometer (product of Perkin-Elmer). The IR spectrum obtained was subjected to automatic baseline adjustment using Perkin-Elmer Spectrum for Windows Ver. 1.4C for the measurement of the absorbance of the peak at 1810 to 1815 $cm^{-1}$. The film thickness was measured using a micrometer.
Bond Strength Test specimens, 5 cm in length and 1 cm in width, were excised from each molding, and the molding portion weakest in bond strength of each specimen was peeled off. Thus, 180-degree peel testing was performed using a Tensilon tester (product of Orientec) and the bond strength in N/cm was measured.
Material Fuel Permeability Coefficient Measurement Each of the copolymers, each in pellet form, for use as the respective layers of a tubular laminate was placed in a mold with a diameter of 120 mm, the mold was set on a press heated to a temperature not lower than the melting point, and the copolymer pellets were melted and pressed at a pressure of about 2.9 MPa to give a 0.15-mm-thick sheet. A SUS316 stainless steel cup for permeability coefficient measurement, 40 mm ø in inside diameter and 20 mm in height, containing 18 ml of CE10 or CE85 was covered with the sheet obtained, and the changes in mass at 60° C. were measured over 1000 hours. The fuel permeability coefficient ($g \cdot mm/m^2/day$) was calculated based on the change in mass per hour, the surface area of the sheet in contact with the liquid and the sheet thickness.
Rate of Fuel Permeation Through Moldings Using CE10 or CE85, the changes in mass at 60° C. were measured, and the mass of the liquid chemical permeating per unit day and per unit inside surface area was calculated.
Tensile Strength Microdumbbell test specimens were pulled on a Tensilon tester (product of Orientec) at room temperature at a rate of pulling of 100 mm/minute, and the maximum point strength and elongation were measured.

In the examples and comparative example, the following resins were used.
Fluororesin a (CTFE-Based Copolymer)
Method of Synthesis A polymerization vessel equipped with a stirrer and a jacket capable of containing 175 kg of water was charged with 50 kg of demineralized pure water and, after thorough purging of the inside space with pure nitrogen gas, the nitrogen gas was eliminated by evacuation. Then, 40.5 kg of octafluorocyclobutane, 2.4 kg of chlorotrifluoroethylene [CTFE], 6.5 kg of tetrafluoroethylene [TFE] and 4.5 kg of perfluoro(propyl vinyl ether) [PPVE] were fed to the vessel under pressure, the temperature was adjusted to 35° C., and stirring was started. Thereto was added 0.2 kg of a 50% (by mass) solution of di-n-propyl peroxydicarbonate [NPP] in methanol as a polymerization initiator to start the polymerization. During the polymerization, a monomer mixture prepared so as to have the same composition as the desired copolymer composition was additionally fed to maintain the vessel inside pressure at 0.8 MPa. After the polymerization, the residual gas in the vessel inside was discharged by evacuation, and the polymer formed was taken out, washed with demineralized pure water and dried to give 19 kg of a CTFE copolymer as a granular powder. The copolymer was then melt-kneaded on a ø 50 mm single-screw extruder at the cylinder temperature of 280° C. to give pellets. The CTFE copolymer obtained in the form of pellets was then heated at 180° C. for 24 hours.

The pellets obtained had the following composition and physical properties.

CTFE/TFE/PPVE: 34.5/63.4/2.1 (mole percent)
Melting point: 230° C.
MFR: 18 g/10 minutes (297° C.—5 kg)
Functional groups: carbonate groups (number of carbonate groups per $10^6$ carbon atom: 100)
Fuel permeability coefficient: 0.3 g·mm/m$^2$/day Fluororesin B
Product of Daikin Industries, trade name: Neoflon EFEP RP5000

Thermoplastic Resin
Polyamide 12: Product of Daicel Degussa, trade name: Vestamid X7297
Modified polyethylene A [PE]: Product of Mitsui Chemicals, trade name: Adomer HB030
Modified polyethylene B [PE]: Product of Arkema, trade name: Lotader AX8840
HDPE: Product of Japan Polyolefin, trade name: HJ451
Polyamide 6: Product of Ube Industries, trade name: Ube Nylon 1030

Example 1

A fluororesin A (layer thickness: 200 µm)/modified polyolefin B (layer thickness: 100 µm)/HDPE film (600 µm) tube with an outside diameter of 20 mm as prepared by multilayer blow molding was sealed at one end by heat sealing, filled with CE10 and then sealed at the other end was placed in an explosion-proof oven in an atmosphere of 60° C., and the changes in weight were measured at regular intervals. Further, after discharging of the fuel, ASTM microdumbbells were punched out of the tube, together with ASTM microdumbbells punched out of the tube before contact with the fuel, were subjected to tensile strength and elongation measurements for comparison. The rate of fuel permeation through the bag wall was 1.5 g/m$^2$/day. The tensile strength and elongation were maintained at levels not lower than 75%. The bond strength of the molded article was 30 N/cm.

Example 2

A fluororesin B (layer thickness: 250 µm)/modified polyolefin B (layer thickness: 100 µm)/HDPE (layer thickness: 650 µm) multilayer tube with an outside diameter of 8 mm was produced using a three-resin three layer-multilayer coextrusion tube die with a multimanifold. One end of the tube was closed with a plug, the tube was then filled with CE10, and the other end was closed with a plug. The whole was placed in an explosion-proof oven in an atmosphere of 60° C., and the changes in weight were measured at regular intervals. Further, the tube after discharging the fuel and the tube before contact with the fuel were compared with respect to tensile strength and elongation. The rate of fuel permeation through the tube wall was 20 g/m$^2$/day. The tensile strength and elongation were maintained at levels not lower than 75%. The bond strength of the molded article was 40 N/cm.

Example 3

A fluororesin B (layer thickness: 150 µm)/modified polyolefin B (layer thickness: 50 µm)/HDPE (layer thickness: 600 µm)/modified polyolefin B (layer thickness: 50 µm)/fluororesin B (layer thickness: 150 µm) multilayer tube with an outside diameter of 8 mm was produced using a five-resin five-layer multilayer coextrusion tube die with a multimanifold. One end of the tube was closed with a plug, the tube was then filled with CE85, and the other end was closed with a plug. The whole was placed in an explosion-proof oven in an atmosphere of 60° C., and the changes in weight were measured at regular intervals. Further, the tube after discharging the fuel and the tube before contact with the fuel were compared with respect to tensile strength and elongation. The rate of fuel permeation through the tube wall was 2 g/m$^2$/day. The tensile strength and elongation were maintained at levels not lower than 75%. The bond strength of the molded article was 31 N/cm.

Example 4

A fluororesin B (layer thickness: 300 µm)/polyamide 12 (layer thickness: 50 µm)/modified polyolefin B (layer thickness: 50 µm)/HDPE (layer thickness: 600 µm) multilayer tube with an outside diameter of 8 mm was produced using a five-resin five-layer multilayer coextrusion tube die with a multimanifold. One end of the tube was closed with a plug, the tube was then filled with CE10, and the other end was closed with a plug. The whole was placed in an explosion-proof oven in an atmosphere of 60° C., and the changes in weight were measured at regular intervals. Further, the tube after discharging the fuel and the tube before contact with the fuel were compared with respect to tensile strength and elongation. The rate of fuel permeation through the tube wall was 18 g/m$^2$/day. The tensile strength and elongation were maintained at levels not lower than 75%. The bond strength of the molded article was 45 N/cm.

Comparative Example 1

A polyamide 12 (wall thickness 1000 µm) tube with an outside diameter of 8 mm was produced by tube extrusion molding. One end of the tube was closed with a plug, the tube was then filled with CE10, and the other end was closed with a plug. The whole was placed in an explosion-proof oven in an atmosphere of 60° C., and the changes in weight were measured at regular intervals. Further, the tube after discharging the fuel and the tube before contact with the fuel were compared with respect to tensile strength and elongation. The rate of fuel permeation through the tube wall was 100 g/m$^2$/day. The tensile strength and elongation were only at levels of 75% or lower.

INDUSTRIAL APPLICABILITY

The hollow molded article of the invention can suitably be used as a container, bottle, tank, bag, tube, hose or pipe or the like for holding a liquid.

EXPLANATION OF SYMBOLS

Figure 1:
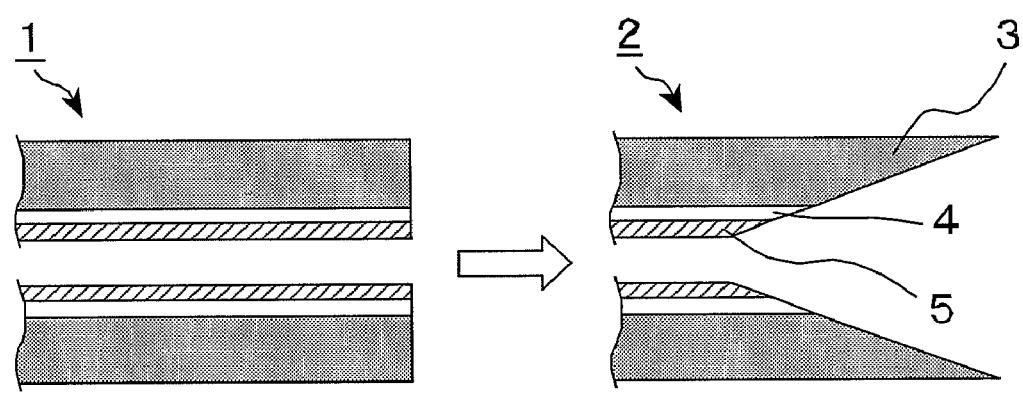
FIG. 1 This shows an exemplary mode of processing of the sheet edge to be subjected to fusion bonding.

1 Sheet before processing
2 Sheet after processing
3 Polyolefin-based layer (A)
4 Modified polyolefin-based layer (B)
5 Fluororesin-based layer (C)

The invention claimed is:

1. A hollow molded article comprising a polyolefin resin-based layer (A), a modified polyolefin resin-based layer (B) and a fluororesin-based layer (C),
   wherein a modified polyolefin resin constituting the modified polyolefin resin-based layer (B) is epoxy-modified high-density polyethylene or amine-modified high-density polyethylene, and
   the fluororesin-based layer (C) constitutes at least one of the innermost and outermost layers.

2. The hollow molded article according to claim 1 which further comprises a polyamide resin-based layer (D) between the layer (B) and the layer (C).

3. The hollow molded article according to claim 1 which is a container for a liquid chemical.

4. The hollow molded article according to claim 1 which is a container for an aqueous solution of urea.

5. The hollow molded article according to claim 1 which is a fuel tank.

6. The hollow molded article according to claim 1 which is a drink or food tank.

7. The hollow molded article according to claim 1 which is a tube or hose to be laid under the ground in a refueling station.

8. A laminate comprising a polyolefin resin-based layer (A), a modified polyolefin resin-based layer (B) and a fluororesin-based layer (C),
   wherein a modified polyolefin resin constituting the modified polyolefin resin-based layer (B) is epoxy-modified high-density polyethylene or amine-modified high-density polyethylene, and
   the fluororesin-based layer (C) constitutes at least one of the innermost and outermost layers.

* * * * *